ized under 35
(12) United States Patent  (10) Patent No.: US 6,981,174 B1
Hanning  (45) Date of Patent: Dec. 27, 2005

(54) METHOD AND APPARATUS FOR A REDUNDANT PORT

(75) Inventor: Gary Hanning, Portola Valley, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 473 days.

(21) Appl. No.: 10/198,972

(22) Filed: Jul. 18, 2002

(51) Int. Cl.[7] .............................................. G06F 11/00
(52) U.S. Cl. ................................................ 714/5; 714/4
(58) Field of Search ........................................ 714/4, 5

(56) References Cited

U.S. PATENT DOCUMENTS

| | | | | |
|---|---|---|---|---|
| 6,148,411 A | * | 11/2000 | Ichinohe et al. | 714/4 |
| 6,678,835 B1 | * | 1/2004 | Shah et al. | 714/4 |
| 6,732,186 B1 | * | 5/2004 | Hebert | 709/239 |
| 6,760,859 B1 | * | 7/2004 | Kim et al. | 714/4 |

* cited by examiner

Primary Examiner—Robert Beausoliel
Assistant Examiner—Timothy M. Bonura
(74) Attorney, Agent, or Firm—Blakely, Sokoloff, Taylor & Zafman LLP

(57) ABSTRACT

A method is provided for a redundant port system in which any port in a packet-forwarding device can be designated as a redundant port for any other port. The redundant port system detects when the primary port fails or is about to fail, and activates or begins to activate the redundant port as a backup. The redundant port system switches to the redundant port by causing the switch fabric in the packet-forwarding device to fail over to the redundant port by updating the port description tables, routing tables, bridging tables, or other switch fabric components to designate the redundant port instead of the failed primary port, and forcing the failed primary port to deactivate. The redundant port system continues to monitor the primary port and reverts to the primary port as the preferred data path as soon as the primary port is capable of being reactivated.

45 Claims, 8 Drawing Sheets

METHOD AND APPARATUS FOR A REDUNDANT PORT

FIELD OF THE INVENTION

The present invention relates to the field of computer networks and internetworking communications technologies. In particular, the present invention relates to a redundant port system used to provide redundancy in a packet-forwarding device.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Extreme Networks, Inc., All Rights Reserved.

BACKGROUND AND RELATED ART

A switch is a packet-forwarding device, such as a bridge (layer 2 switch) or a router (layer 3 switch), that determines the destination of individual data packets (such as Ethernet frames) and selectively forwards them across a network according to the best route for their destination. The best route is associated with one of a number of ports on the packet-forwarding device, which are the device's external interface to the network. The port is a mission critical part of a packet-forwarding device because the port oftentimes is an uplink, collapsing thousands of users in a local area network (LAN) onto a backbone such as the Internet. The port, therefore, becomes a lifeline to all of the LAN's users connected to that port. But the port also is, by nature, a physical link that is made up of cables, connectors, fibre, copper, etc. things that can fail, be cut, and get dirty—not to mention electronics that can break down. Hence, there are many problems that can cause physical links, and thus ports, to fail.

In the past, each port was treated as a separate entity, and there was no concept of a standby port that watched its associated active port and took over in case of failure. Nowadays, ports are often backed up, and the challenge is to back up many ports on a packet-forwarding device in a way that is reliable, efficient, low cost, and, most importantly, very fast.

Prior art methods of backing up ports include providing a separate backup packet-forwarding device, referred to as a standby router. The use of standby routers in an Internet Protocol (IP) network is known in the art. The Internet Engineering Task Force (IETF) has published a draft standard protocol for using standby routers, also referred to as redundant routers, entitled Virtual Router Redundancy Protocol (VRRP), version 2-05, on Jan. 5, 2000. Numerous proprietary protocols also exist, including the Extreme Standby Router Protocol (ESRP), which is part of the switch operating software sold under the trademark "ExtremeWare" by Extreme Networks, Inc., of Santa Clara, Calif., the assignee of the present application.

One of the drawbacks to using redundant routers is that the standby router does not usually kick in until packets have already been dropped due to inoperable links. Also, the takeover process itself is relatively slow, during which time many more packets may be dropped. Using a separate packet-forwarding device as a standby router is also very expensive, costing upwards of $100,000 dollars each. Moreover, introducing another device into the network only adds more equipment that can fail, e.g. additional chassis, power supplies, etc. Thus, the more equipment, the greater the chance of failure, and the more expensive it is to operate the network.

A better alternative is to supply port-level redundancy within a single device, which is cheaper, simpler, and easier to manage and deploy. When deploying port-level redundancy within a single device the ports are backed up on the port level instead of at the switch level, thereby providing the desired level of network resiliency and availability without the complexity of adding another switch or router to the network. The user needs only to install a second network interface card (NIC) in their personal computer or workstation and connect it to the same switch, which in turn, can be connected to other switches. Should the primary data path fail, the redundant data path is available to take over in a very short period of time (typically in sub-seconds), allowing the user to maintain their connection to the backbone.

An example of a prior art technology to provide data path redundancy in a single device is the hardware-based redundancy built into ports at the physical layer level using high speed Ethernet Media Access Control (MAC) integrated circuit (IC) technology, referred to as a redundant PHY. The MAC is the component of a LAN switch that controls communication over an Ethernet link and is used to build high speed LAN switches based on Ethernet, Fast Ethernet and Gigabit Ethernet. A MAC chip having both a primary PHY and a redundant PHY is incorporated into switches sold under the trademark "Summit 48" by Extreme Networks, Inc., of Santa Clara, Calif., the assignee of the present application. For example, the Summit 48 has 48 Fast Ethernet ports and 2 Gigabit Ethernet ports that can be equipped with redundant PHYs.

FIGS. 1A and 1B are simplified block diagrams that illustrate certain aspects of a prior art port using a redundant PHY. A packet-forwarding device 100 connects a local area network LAN 102 serving virtual LANs VLANA 106 and VLANB 108 to network 104. The packet-forwarding device 100 comprises several ports, including the illustrated port 5 110 equipped with a MAC chip 111 having redundant PHY capability to connect the port 5 110 to LAN 102 via a primary link 122 and a redundant link 124. The packet-forwarding device 100 further comprises a switch fabric 112 having a packet forwarder 114, a routing table 116, a bridging table 118, a port description table 119, and other components for carrying out packet-forwarding operations. During normal operation, port 5 110 uses the primary link 122 as the preferred data path, and the redundant PHY is used to switch the physical layer of the MAC chip 111 to use the redundant link 124 only when the primary link 122 fails. Although seemingly straightforward, as a practical matter switching to the redundant link 124 is quite difficult for a number of reasons.

Unlike the prior art standby routers, which are maintained in a hot standby state with their ports connected via active redundant links, the prior art ports equipped with redundant PHYs cannot maintain active redundant links at the same time as active primary links. This is because those routing protocols that are based on a MAC's link state, such as the Open Shortest Path First (OSPF) for IP unicast routing, collectively referred to herein as link state routing protocols (LSRPs), make decisions about the data path over which traffic is forwarded based on the links' states. If the redundant links were active at the same time as the primary links, the LSRPs would get confused about which data path to use for a given port. Therefore, during normal operation, the prior art hardware redundant PHY forces the redundant link 124 down until it is needed, i.e., until the primary link 122 fails or is otherwise determined not to be the best physical data path. But forcing the redundant link 124 down introduces some uncertainty as there are many steps involved in activating a physical link. Therefore, to insure the reliability of activating the redundant link 124 when needed, in addition to being equipped with a redundant PHY the prior art port 5 110 operates in conjunction with a link monitor 120 that uses an Institute of Electrical and Electronics Engineers (IEEE) Ethernet-based auto-negotiation protocol to help monitor the status of the active primary link 122 and inactive redundant link 124 and to set the link state to disabled when it is determined that a link should be forced down.

The auto-negotiation protocol is part of the IEEE standard 802.3 protocol, which was modified in 1995 to include auto-negotiation as part of the adoption of the IEEE 802.3u 100 Mbps Fast Ethernet standard. The auto-negotiation protocol enables devices to negotiate the speed and mode (duplex or half-duplex) when activating an Ethernet link. In the illustrated redundant PHY used in port 5 110 the link monitor 120 uses the auto-negotiation protocol to obtain information about the status of the primary and redundant links 122/124. The link monitor 120 uses the status information in implementing an algorithm to determine whether to deactivate the primary link 122 and fully or partially activate the redundant link 124, and vice versa. For example, if there are five steps to activating a link, then when the auto-negotiation status of the primary link 122 indicates that it is beginning to fail, the link monitor 120 causes the redundant PHY in MAC chip 111 to partially activate the redundant link 124 up to the fourth step. Maintaining the redundant link 124 at the fourth step does not interfere with the LSRP and increases the likelihood that the redundant link 124 can be reliably activated to the fifth and final step when needed, i.e., if and when the primary link 122 ultimately fails.

As illustrated in FIG. 1B, when the redundant link 124 is active, the primary link 122 is inactive, but the routing table 110 in the switch fabric 112 reflects the same port number designation of port 5 for the destination hosts in VLANA 106 and VLANB 108. Thus, even though the physical data path has changed, the port number is the same (i.e., port 5) since the redundant PHY is located in the same port, the routing table 116 remains unchanged, and the packet forwarder 114 in the switch fabric 112 operates as before. As a result, the operation of the redundant PHY capability in port 5 110 is transparent to the switch fabric 112.

One of the drawbacks to using the above-described hardware-based redundant PHY in a port is that redundancy is only provided for those ports equipped with the specialized redundant PHY hardware and devices having the associated link monitor and port switching capability. Upgrading existing equipment can be expensive and impractical, especially in large networks employing equipment from multiple vendors. Moreover, the redundant PHY does not provide "true" port-level redundancy for the port. For example, when the primary link 122 fails because of a problem with an upstream switch, changing over to the redundant PHY doesn't solve the problem since the port is still connected to the bad upstream switch.

SUMMARY

According to one aspect of the invention, a method is provided for a redundant port system in which any port in a packet-forwarding device can be designated as a redundant port for any other port in the same device, including another blade in the same device. The port for which redundancy is provided is designated as a primary port.

According to one aspect of the invention, the redundant port system detects when the primary port fails or is about to fail, and activates or begins to activate the redundant port as a backup. When the primary port fails, the redundant port system switches over to the redundant port by causing the switch fabric in the packet-forwarding device to fail over to the redundant port. According to one aspect of the invention, the redundant port system causes the switch fabric to fail over to the redundant port by updating port description tables or other switch fabric components to designate the redundant port instead of the failed primary port.

According to one aspect of the invention, after causing the switch fabric to fail over to the redundant port, the redundant port system causes the failed primary port to deactivate. The redundant port system continues to monitor the primary port and may switch back over to the primary port as the preferred data path as soon as the primary port is able to be reactivated, depending on the configuration settings of the device.

According to one aspect of the invention, the method for a redundant port system supports load shared groups in which multiple ports are trunked together to act as one logical port. In the context of load shared groups, a method for a redundant port system is provided in which any one or more ports in a packet-forwarding device, including a load shared group of ports, can be designated as a redundant port or ports for any load shared group of ports in the same device, or even for any load shared group of ports in another packet-forwarding device.

According to one aspect of the invention, the redundant port system detects when one or more of the primary ports in the load shared group of primary ports fails or is about to fail, and activates or begins to activate the redundant port or load shared group of redundant ports as a backup. When the load shared group of primary ports fails, the redundant port system switches over to the redundant port or ports by causing the switch fabric in the packet-forwarding device to fail over to the redundant port or ports. According to one aspect of the invention, the load shared group of primary ports fails when a predetermined threshold number of primary ports in the load shared group fails.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for a redundant port system, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system or a packet-forwarding device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1A:
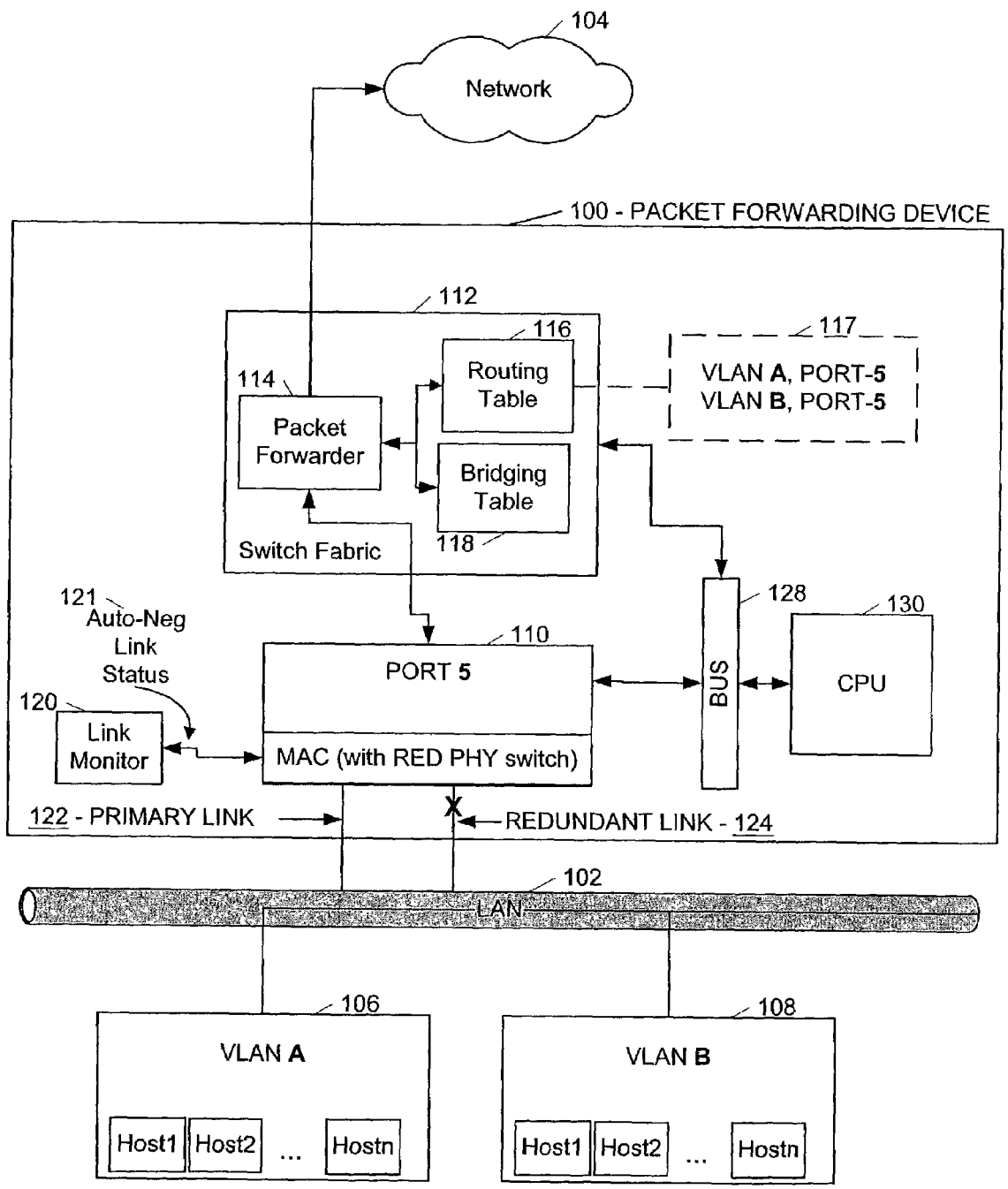
FIG. 1A is a block diagram illustrating certain aspects of a packet-forwarding device and operating environment for a port using a redundant PHY.
Figure 1B:
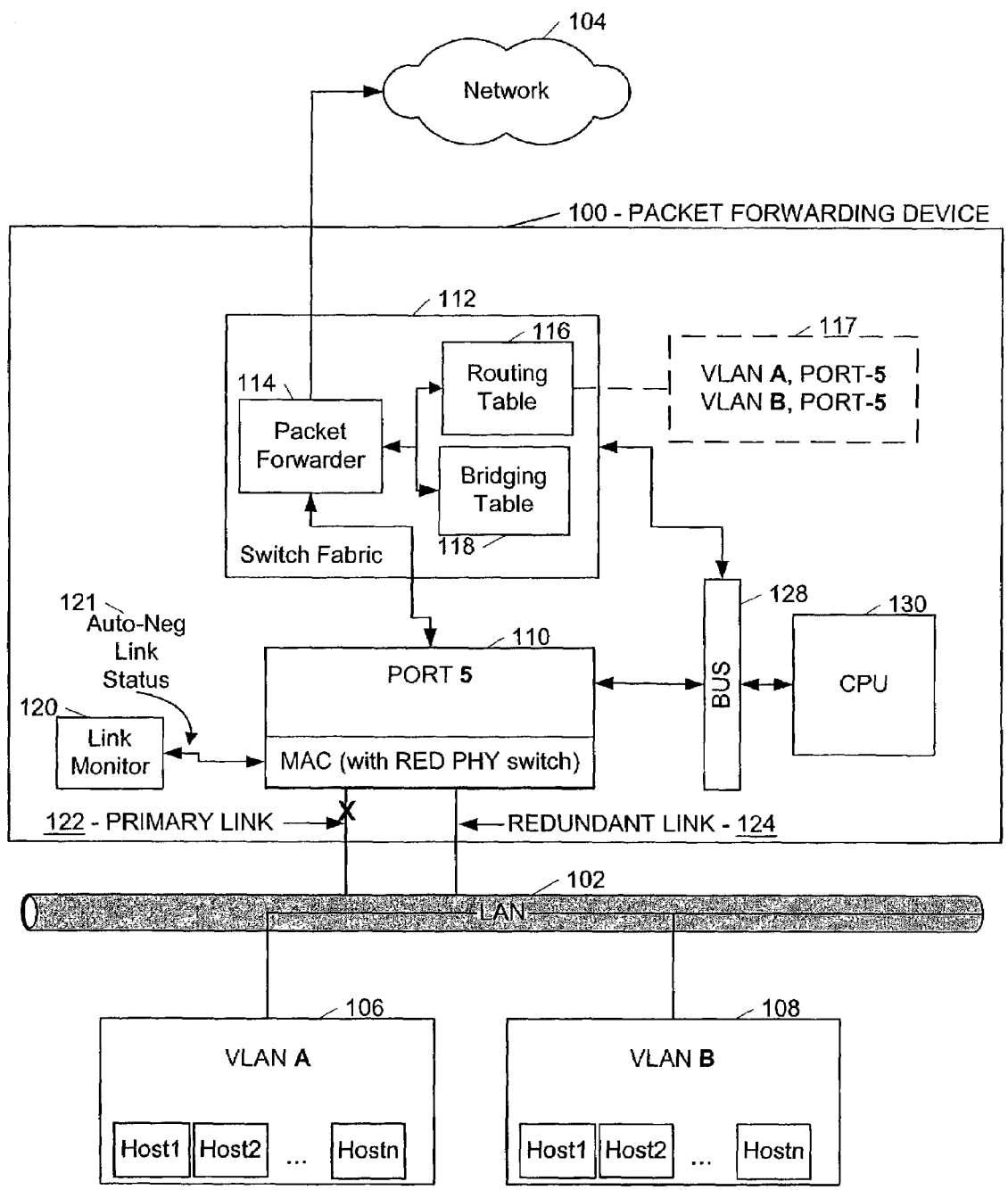
FIG. 1B is a block diagram illustrating certain other aspects of a packet-forwarding device and operating environment for the illustrated port using a redundant PHY of FIG. 1A.
Figure 2A:
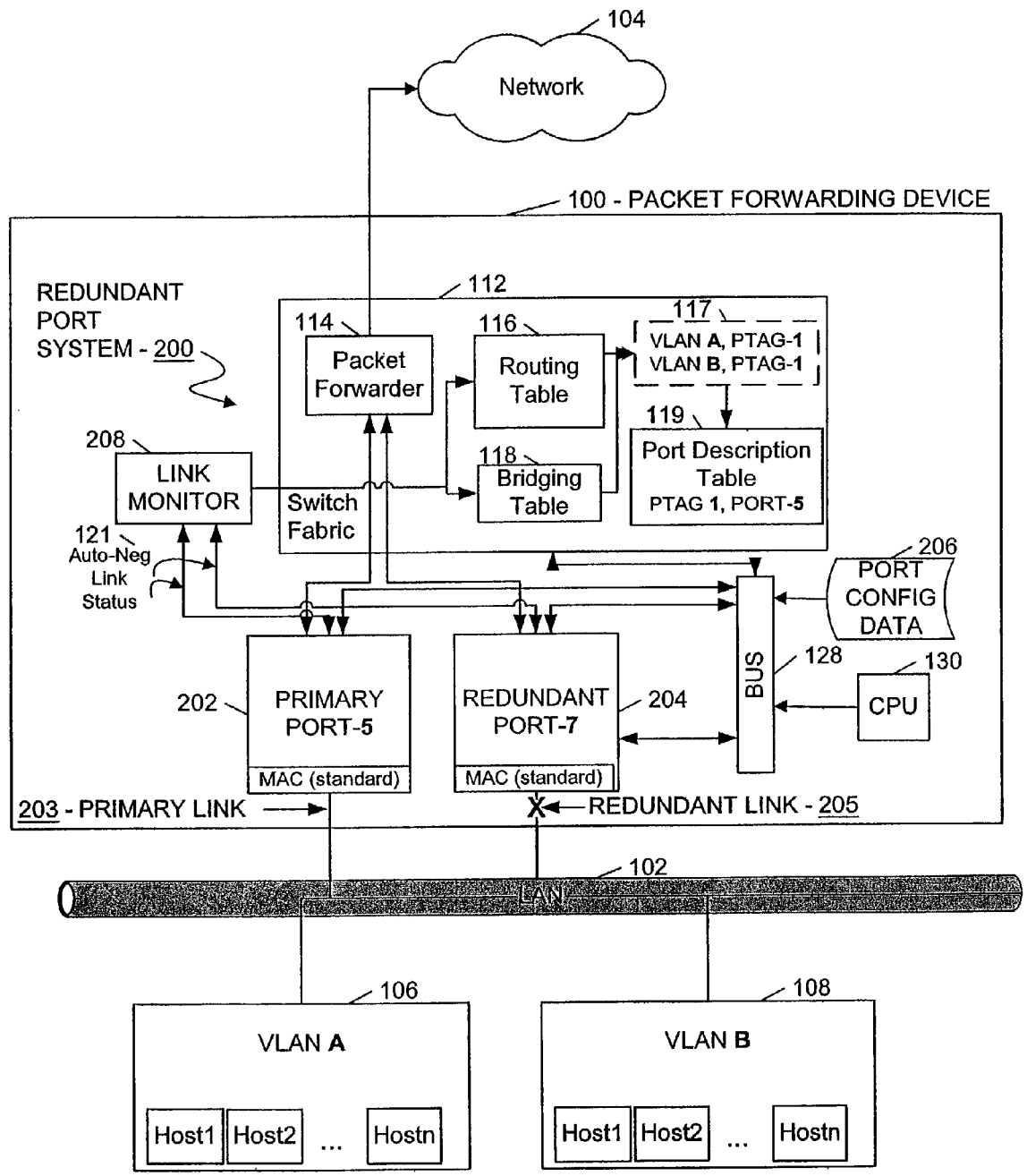
FIG. 2A is a block diagram illustrating a packet-forwarding device incorporating a redundant port system in accordance with one embodiment of the invention, and the operating environment in which certain aspects of the invention may be practiced.
Figure 2B:
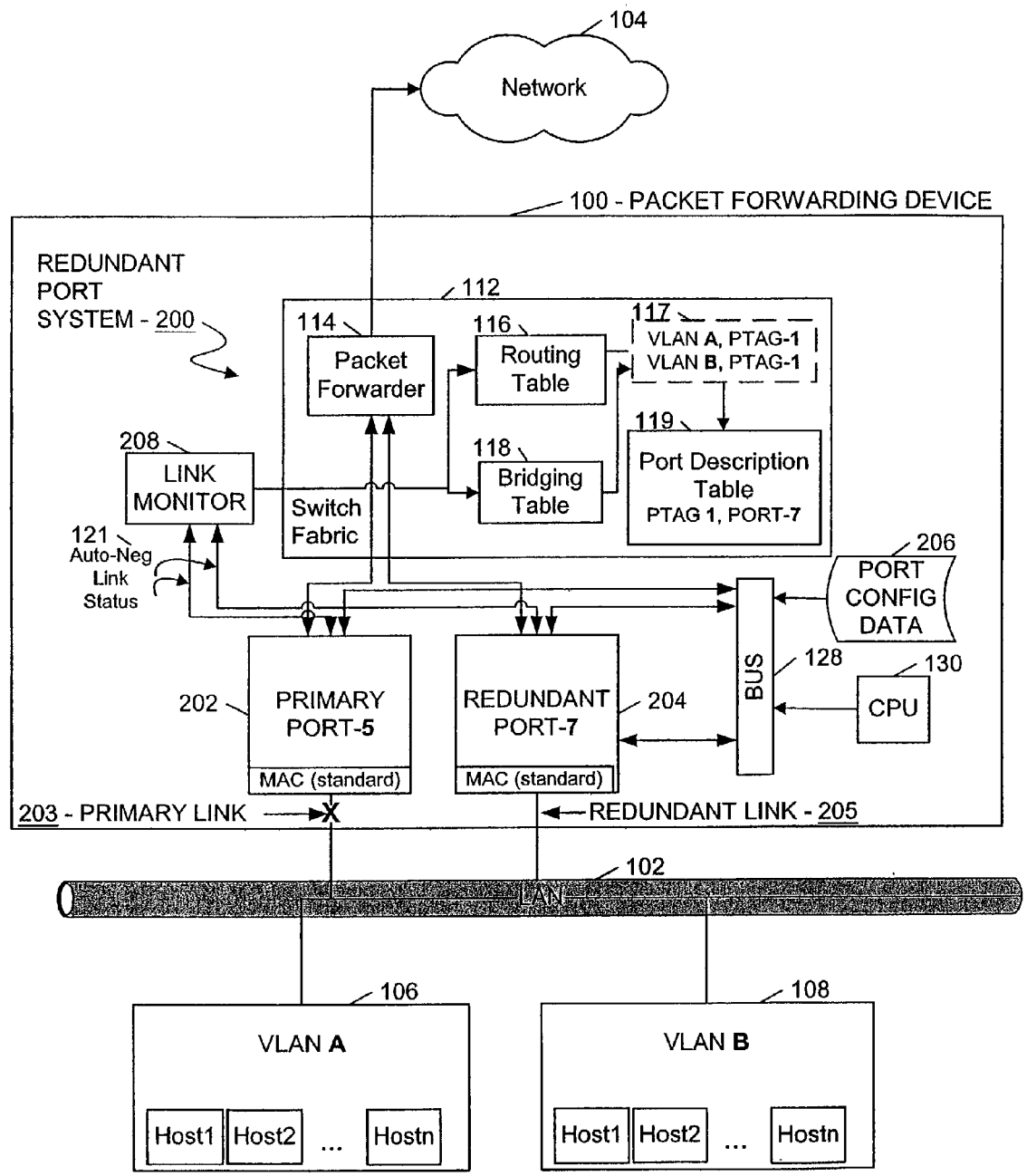
FIG. 2B is a block diagram illustrating certain other aspects of the embodiment of the invention illustrated FIG. 2A.

FIGS. 2A–2B are block diagrams illustrating a packet-forwarding device 100 incorporating a redundant port system 200 in accordance with one embodiment of the invention, and the operating environment in which certain aspects of the invention may be practiced. As shown, the packet-forwarding device 100 connects a local area network LAN 102 serving virtual LANs VLANA 106 and VLANB 108 to network 104. The packet-forwarding device 100 comprises several ports each equipped with a standard MAC chip, any one of which can be specified as the primary port 202 or the redundant port 204. Thus, unlike the prior art port which employs specialized hardware incorporated into a single port (i.e., the redundant PHY in the specialized MAC chip), the redundancy is provided by a completely separate port. For the purpose of illustration, port 5 is the primary port 202 and port 7 is the redundant port 204, however other ports may be so designated. It should be noted that the primary and redundant ports 202/204 may each reside on the same packet-forwarding device 100 as shown, or on different packet-forwarding devices (not shown) connected to the same LAN 102, without departing from the scope of the present invention.

Both the primary port 5 202 and the redundant port 7 204 connect the hosts in VLAN A 106 and VLAN B 108 on LAN 102 to the packet-forwarding device 100 via a primary link 203 and a redundant link 205. The primary link 203 is generally the preferred data path, and the redundant link 205 is the alternate data path. The packet-forwarding device 100 further comprises a switch fabric 112 having a packet forwarder 114, a routing table 116, a bridging table 118, a port description table 119, and other components for carrying out packet-forwarding operations. During normal operation, port 5 202 and primary link 203 is the preferred data path, and the redundant port 7 204 and redundant link 205 are inactivated. The packet-forwarding device 100 further comprises a port configuration data 206, which contains the policy for a primary or redundant port, and which can be loaded onto whichever port is active at the time of failover.

As with the prior art port using a hardware redundant PHY, the packet-forwarding device 100 uses a link monitor 208 to obtain information about the link status of the primary and redundant links 203/205 to the primary and redundant ports 202/204 using the previously described IEEE auto-negotiation protocol. In one embodiment, the link monitor 208 obtains the information by examining the physical layer, i.e., receiving an indication from the standard MAC on the primary and redundant ports 202/204. For example, obtaining the information directly from the physical layer may be done before even attempting to use the auto-negotiation protocol, since if the physical layer is bad, there is no point in going further. In one embodiment the standard MAC on the primary and redundant ports 202/204 may be configured to automatically serve up the status of the physical layer to the link monitor 208 using an interrupt. The link monitor 208 uses the resulting link status information 121, either from the auto-negotiation protocol or the physical layer, or a combination thereof, to implement an algorithm to determine whether to deactivate the primary link 203 and fully or partially activate the redundant link 205, and vice versa. Unlike the prior art port, however, the link monitor 208 does not interact directly with the ports to switch between the primary and redundant links 203/205, but rather interacts with the switch fabric 112 to update the port description table 119, or other switch fabric components as needed to reflect the current active port designations.

For example, in the illustrated example in FIG. 2A, port 5 is the primary port 202, so the routing table 116 contains route table entries 117 that indicate that the current active port designations for destination hosts in VLAN A 106 and VLAN B 108 are port 5. But, as illustrated in FIG. 2B, when the redundant port 204 is activated instead due to the inactivation or other failure of the primary port 202 and associated primary link 203, then the link monitor 208 updates the port description table 119 (or other switch fabric component) with port description entries that indicate that destination hosts for route table entries 117 of VLAN A 106 and VLAN B 108 which point to port descriptor 1 (also referred to as a port tag 1, or PTAG 1) are accessible via port 7. The packet forwarder 114 uses the updated port description entries 119 to make the forwarding decisions about which data path to use. As a result, unlike the prior art port using a redundant PHY, the operation of the redundant port system 200 in the illustrated embodiment takes place in the switch fabric 112 itself. Further, by using the port description tables 119, the redundant port system 200 is able to provide redundancy without affecting the route tables 116 or bridging tables 118. It should be understood, however, that the redundant port system 200 may update the routing tables 116 or bridging tables 118 directly without departing from the scope of the invention. For example, when the port designations are stored in routing tables 116 or bridging tables 118 and there is no port description table 119 available, then the port designations may be updated directly in routing tables 116 or bridging tables 118 as appropriate.

Figure 3A:
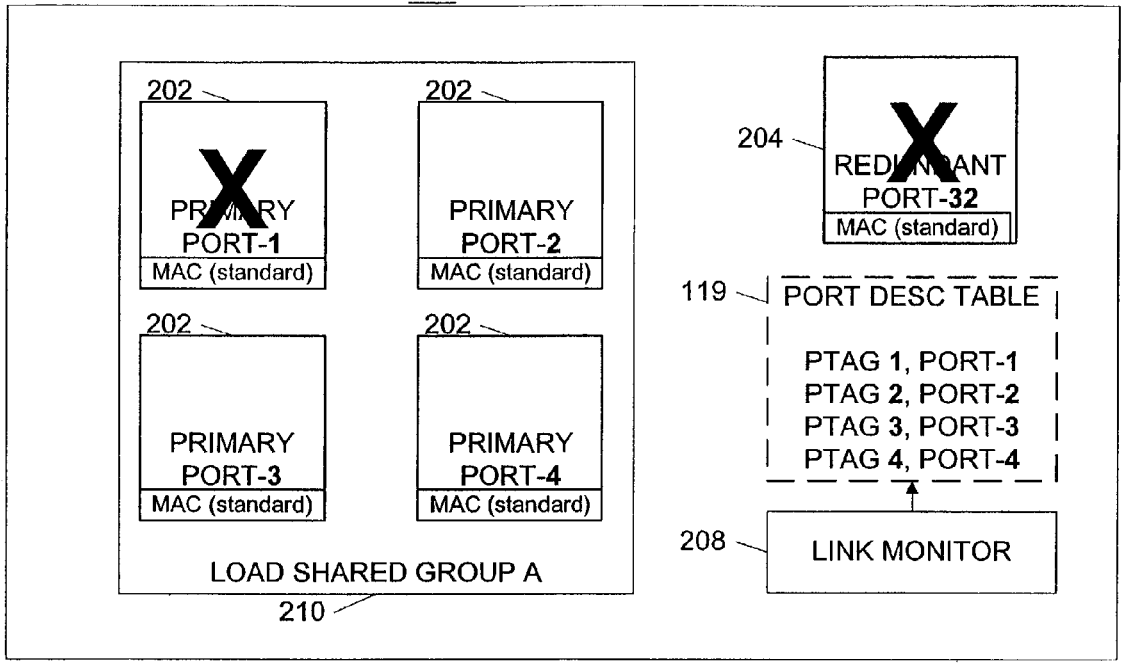
FIG. 3A is a block diagram illustrating a redundant port system in accordance with another embodiment of the invention, and the operating environment in which certain aspects of the invention may be practiced.
Figure 3B:
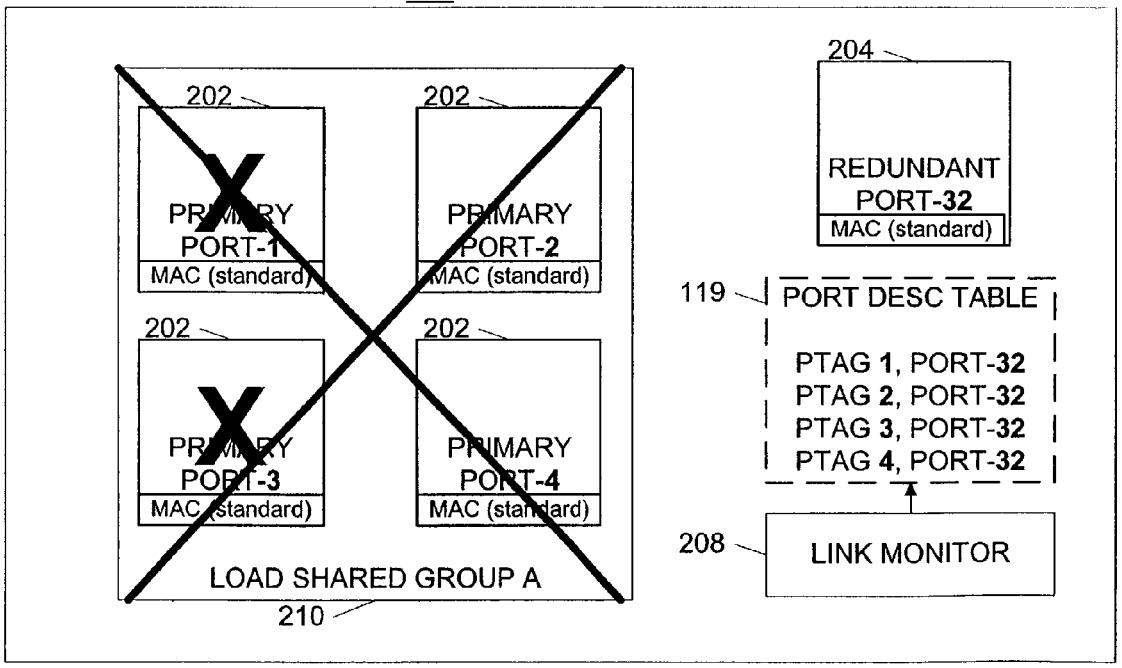
FIG. 3B is a block diagram illustrating certain other aspects of the embodiment of the invention illustrated in FIG. 3A.

FIGS. 3A–3B are block diagrams illustrating a redundant port system 200 in accordance with another embodiment of the invention, and the operating environment in which certain aspects of the invention may be practiced. As shown in FIG. 3A, the packet-forwarding device may have multiple primary ports 202 organized in a primary load shared group A 210 served by one or more redundant ports 204, such as the illustrated redundant port 32. A load shared group refers to multiple ports trunked together to act as one logical port in a packet-forwarding device. In the context of load shared groups, the port configuration data 206 may include how many ports are in the load shared group to which the port belongs, as well as how many ports in the load shared group must fail before switching to or from a preferred data path. Load shared groups are typically used in port configurations where, for example, the multiple primary ports 202 are each 1 gigabit ports and the single redundant port 204 is a 10 gigabit port. It should be understood that the redundant port 204 may also be multiple redundant ports 204 organized into a separate load shared group (not shown), without departing from the scope of the present invention.

In one embodiment of a redundant port system 200, in the context of the load shared group A 210 illustrated in FIG. 3A, the port description table 119 reflects the current active port designations, for example port 1 hosts in VLAN A pointing to PTAG 1, port 2 for hosts in VLAN B pointing to PTAG 2, port 3 for hosts in VLAN C pointing to PTAG 3, and port 4 for hosts in VLAN D pointing to PTAG 4. This is so, even though one of the primary ports in the load shared group A 210 has failed, namely port 1, because the link monitor 208 will fail over to the redundant port 204, port 32, only when the number of failed primary ports in the load shared group A 210 meets or exceeds a certain threshold. In the illustrated example in FIG. 3A, the number of primary ports (and associated primary links) that must fail after which the threshold is met is two ports.

FIG. 3B illustrates the result of a fail over to the redundant port 32, after the threshold number of primary ports in load shared group A has been met, in accordance with one embodiment of a redundant port system 200. As shown, primary ports 1 and 3 have both failed. Even though the remaining ports 2 and 4 are active, the threshold of two failed ports has been met, thereby causing the link monitor 208 to inactivate all the primary ports 202 in load shared group A 210 and to update the port description table 119 to reflect the current active port designations for PTAGs 1–4, in this example designating port 32 for hosts in VLANs A, B, C, and D pointing to PTAGs 1–4.

Figure 4:
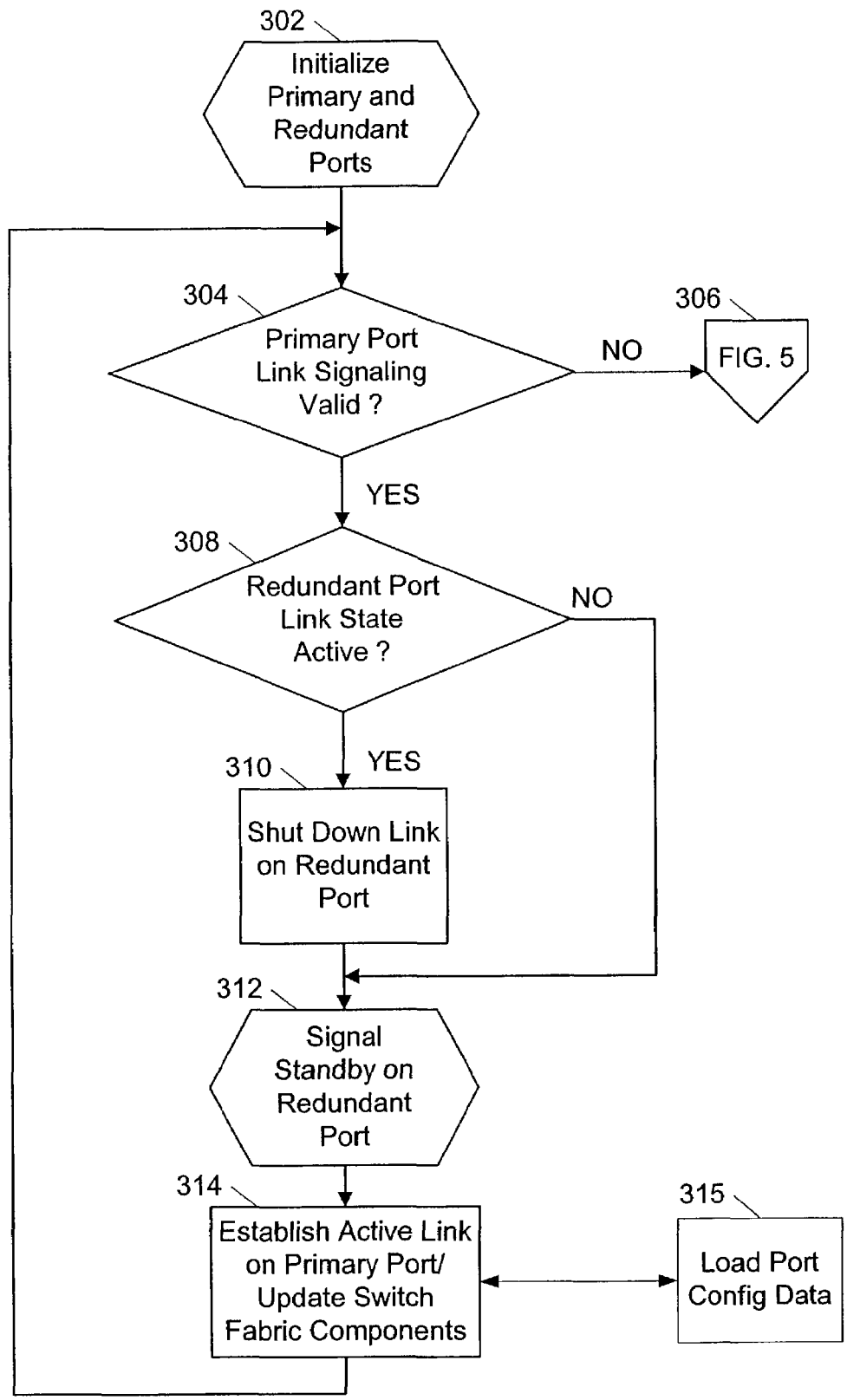
FIG. 4 is a flow diagram illustrating certain aspects of a method to be performed by a packet-forwarding device incorporating a redundant port system in accordance with one embodiment of the invention illustrated in FIGS. 2A–2B and FIGS. 3A–3B.
Figure 5:
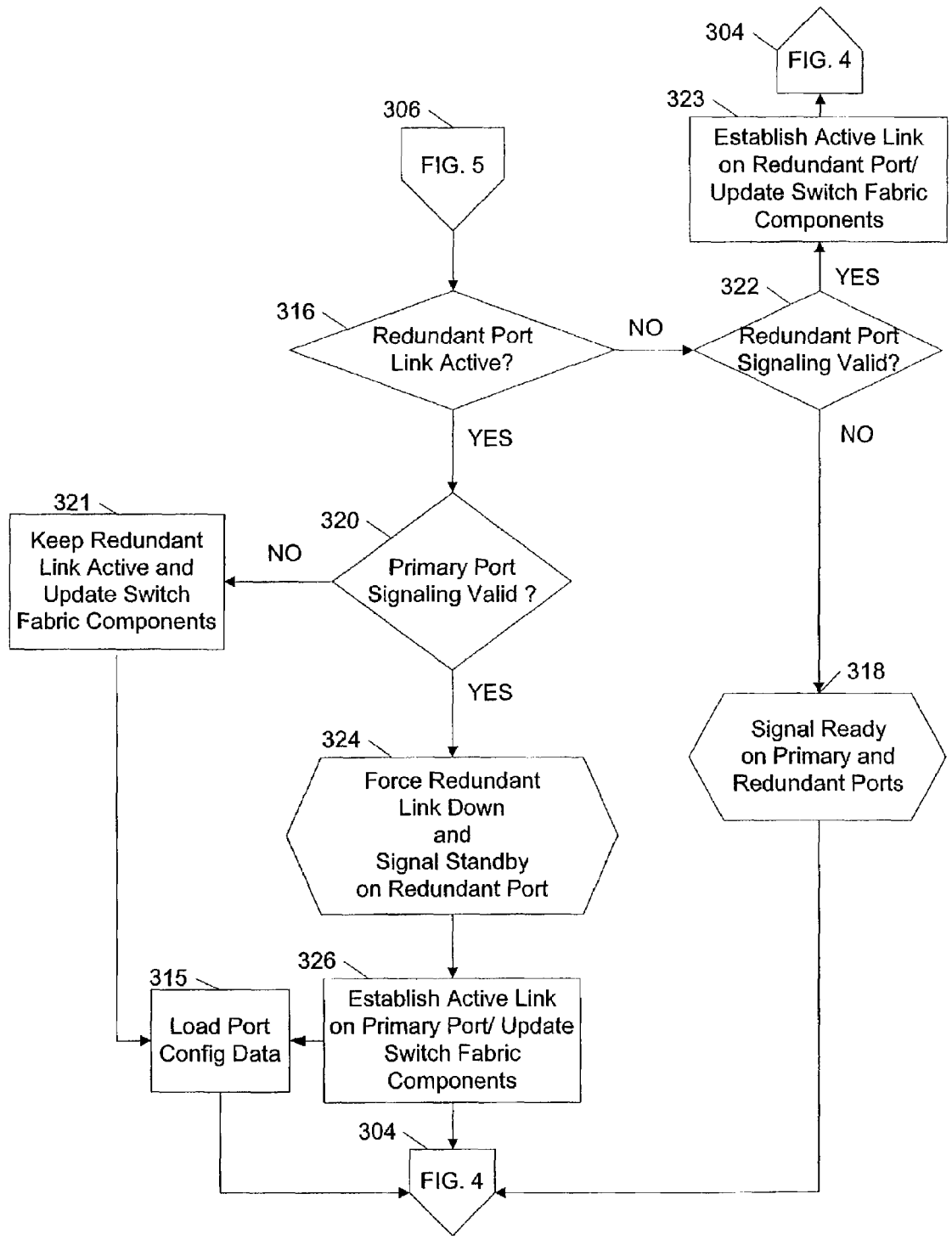
FIG. 5 is a flow diagram illustrating certain other aspects of a method to be performed by a packet-forwarding device incorporating one embodiment of the invention illustrated in FIGS. 2A–2B and FIGS. 3A–3B.

Turning now to FIGS. 4–5, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

FIG. 4 is a flow diagram illustrating certain aspects of a method to be performed by a packet-forwarding device 100 incorporating a redundant port system 200 in accordance with one embodiment of the invention illustrated in FIGS. 2A–2B and FIGS. 3A–3B. In one embodiment, at preparatory block 302, the redundant port system 200 initializes the primary and redundant ports, for example by partially activating the ports to the fourth step of the IEEE auto-negotiating protocol. The state of readiness is sufficient to quickly and reliably activate the ports without interfering with the LSRP. At decision block 305, the link monitor 208 of the redundant port system 200 determines whether the primary port's link signaling is valid. In one embodiment, the determination of whether the link signaling is valid is based on whether the IEEE auto-negotiation link status 121 indicates, among other things, that the link is active, in state of readiness, failed, or about to fail. It should be noted that other types of auto-negotiation protocols may be used to obtain the link status without departing from the scope of the present invention.

In one embodiment, when the primary port's link signaling is not valid, then processing branches to decision block 316 in FIG. 5, a detailed description of which is provided below. However, when the primary port's link signaling is valid, then processing continues at decision block 308, where the link monitor further determines whether the redundant port's link state is active. When the redundant port's link state is active, the redundant port system 200 causes the link to the redundant port to be shut down to avoid interference with the link state routing protocol (LSRP), thereby placing the redundant port's link state to inactive. At preparatory block 312, the redundant port system 200 signals standby to place the redundant port into a standby state, or a state of near-readiness so that the port can be quickly activated if needed, but without interfering with LSRP processing. At processing block 314, with the redundant port safely in the standby state, the redundant port system 200 is now able to establish an active link on the primary port and to update the port designations in the switch fabric components accordingly. In one embodiment, at processing block 315, the redundant port system 200 further loads the primary port configuration data 206 to the now active primary port to insure that the proper policy configuration is present.

FIG. 5 is a flow diagram illustrating certain other aspects of a method to be performed by a packet-forwarding device incorporating a redundant port system 200 in accordance with one embodiment of the invention illustrated in FIGS. 2A–2B and FIGS. 3A–3B. At decision block 316, the redundant port system 200 determines whether the redundant port's link is active. When the redundant port's link is not active, at decision block 322, the redundant port system 200 determines whether the redundant port signaling is valid. When valid, at processing block 323 the redundant port system 200 establishes an active link on the redundant port and updates the switch fabric components accordingly. In one embodiment the switch fabric components are updated by updating the port designations in the port description table 119. The redundant port system 200 continues processing at FIG. 4, where the redundant port system 200 again begins the process of monitoring the primary and redundant ports. When at decision block 322, the redundant port system 200 determines that the redundant port signaling is not valid, then at preparatory block 318 the redundant port system 200 signals ready to place both the primary and redundant ports into a state of readiness, for example by partially activating the ports to the fourth step of the IEEE auto-negotiating protocol. The state of readiness is sufficient to quickly and reliably activate the ports without interfering with the operation of the LSRPs. Processing then resumes at decision block 304 in FIG. 4, where the redundant port system 200 again begins the process of monitoring the primary and redundant ports. When, at decision block 316 the redundant port system 200 determines that the redundant port's link is active, processing continues at decision block 320, where the redundant port system 200 further determines whether it is possible to activate the preferred data path using the primary link, by determining whether the primary port's signaling is valid.

In one embodiment, the primary port's signaling is not valid when the primary link is failing or about to fail as determined from the hardware state of the link. For example, in one embodiment, the link may go through 4 or 5 hardware states before it is fully activated. The lower hardware states 1, 2, or 3, may indicate that the link is failing or about to fail. When failure or near failure is determined, then the redundant port system 200 makes the decision at block 321 to keep the redundant link active in case the primary link becomes inactive and updates the port designations accordingly. In one embodiment, at processing block 315, the redundant port system 200 further loads the redundant port configuration data 206 to the now active redundant port to insure that the proper policy configuration is present. Processing resumes at decision block 304 in FIG. 4, where the redundant port system 200 again begins the process of monitoring the primary and redundant ports.

In one embodiment, when the primary port's signaling is valid (i.e., the primary link is active or at least in a hardware state of readiness), then the redundant port system 200 attempts to revert to the preferred data path by switching back to the primary link. At preparatory block 324, the redundant port system 200 begins the process by forcing the redundant link down to avoid interference with the operation of an LSRP, and signaling standby on the redundant port to place the redundant port into a hardware state of readiness or near-readiness while still keeping the redundant link inactive. At processing block 326, the redundant port system 200 completes the process of switching back to the preferred data path by establishing an active link on the primary port, and updating the port designations in the switch fabric components accordingly. In one embodiment the port designations are updated in the port description table 119. In one embodiment, at processing block 315, the redundant port system 200 further loads the primary port configuration data 206 to the now active primary port to insure that the proper policy configuration is present.

Figure 6:
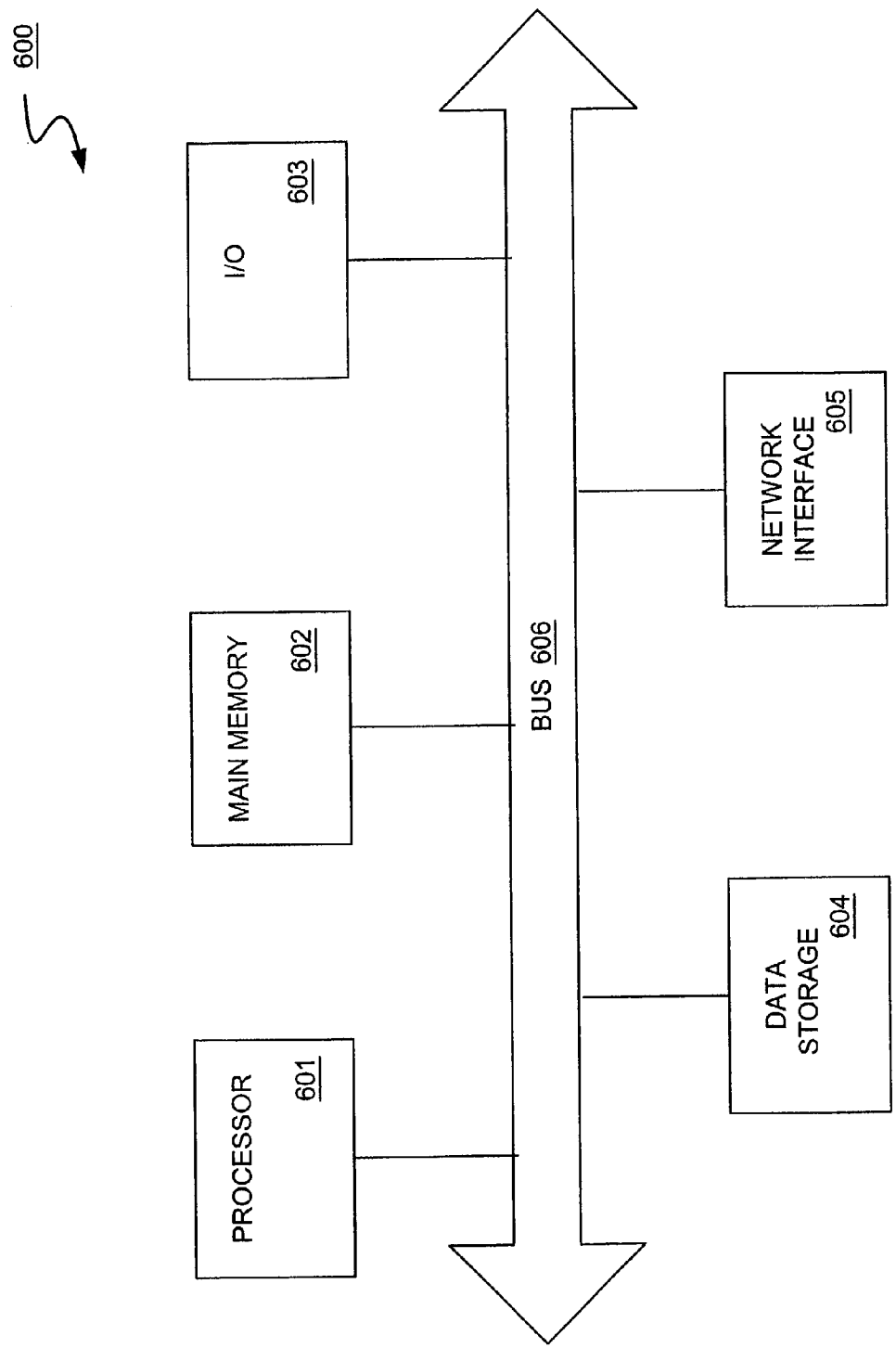
FIG. 6 illustrates one embodiment of a suitable computing environment in which certain aspects of the invention illustrated in FIGS. 2A–2B, FIGS. 3A–3B and FIGS. 4–5 may be practiced.

FIG. 6 illustrates one embodiment of a suitable computing environment in which certain aspects of the invention illustrated in FIGS. 2A–2B, FIGS. 3A–3B and FIGS. 4–5 may be practiced. In one embodiment, the method for a redundant port system 200 may be implemented on a computer system 600 having components 601–606, including a processor 601, a memory 602, an Input/Output device 603, a data storage 704, and a network interface 705, coupled to each other via a bus 608. The components perform their conventional functions known in the art and provide the means for implementing the redundant port system 200. Collectively, these components represent a broad category of hardware systems, including but not limited to general purpose computer systems and specialized packet-forwarding devices.

In one embodiment, the memory component 602, may include one or more of random access memory (RAM), and nonvolatile storage devices (e.g., magnetic or optical disks) on which are stored instructions and data for use by processor 601, including the instructions and data that comprise the switch fabric 112 and switch fabric components, as well as the link monitor 208, port configuration data 206 and other components of the redundant port system 200.

In one embodiment, the network interface component 605 may include the primary port 202 and redundant port 204, as well as the logical groupings of ports into load shared groups 210. The data storage component 604 may also represent the link status information 121 obtained by the link monitor 208, the routing or bridging tables 116/118 in the switch fabric 112, and any other storage areas such as packet buffers, etc., used by the packet-forwarding device 100 and switch fabric 112 for forwarding network packets or messages.

It is to be appreciated that various components of computer system 600 may be rearranged, and that certain implementations of the present invention may not require nor include all of the above components. Furthermore, additional components may be included in system 600, such as additional processors (e.g., a digital signal processor), storage devices, memories, network/communication interfaces, etc.

In the illustrated embodiment of FIG. 6, the method and apparatus for a redundant port system in accordance with one embodiment of the invention as discussed above may be implemented as a series of software routines executed by computer system 600. The software routines may comprise a plurality or series of instructions, code sequences, configuration information, or other data to be accessed and/or executed by a processing system such as one or more of processor 601. Initially, the series of instructions, code sequences, configuration information, or other data may be stored on a data storage 604 and transferred to memory 602 via bus 608. It is to be appreciated that the series of instructions, code sequences, configuration information, or other data can be stored a data storage 604 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 605. The instructions, code sequences, configuration information, or other data may be copied from the data storage 604, such as mass storage, or from the propagated data signal into a memory 602 and accessed and executed by processor 601.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for a redundant port system. From the foregoing description, those skilled in the art will recognize that many other variations of the present invention are possible. In particular, while the present invention has been described as being implemented in a network comprising one or more packet-forwarding devices 100 connecting a LAN 102 and a network 104, some of the logic may be distributed in other components of a network or internetwork application. Thus, the present invention is not limited by the details described. Instead, the present invention can be practiced with modifications and alterations within the spirit and scope of the appended claims.

What is claimed is:

1. A method for port redundancy comprising: designating two or more redundant ports to backup two or more primary ports, wherein the redundant and primary ports are located in the same device and any of the redundant ports may be used to backup any of the primary ports;
   Activating the redundant port when a primary port fails; and
   Updating a data path to use the redundant port instead of the failed port.

2. The method of claim 1, further comprising:
   reverting to the primary port when the primary port recovers, including inactivating the redundant port, activating the primary port, and updating the data path to use the primary port instead of the redundant port.

3. The method of claim 2, further comprising:
   determining when first primary port recovers using an auto-negotiation protocol.

4. The method of claim 2, wherein activating the port includes updating a port designation in a port description table to the activated port, the port designation corresponding to the port designated for the data path.

5. The method of claim 2, wherein updating the data path includes updating a port designation in a route table corresponding to the data path.

6. The method of claim 1, wherein designating the redundant port to backup the primary port includes inactivating the redundant port until the primary port fails.

7. The method of claim 1, further comprising:
   determining when the primary port fails by using an auto-negotiation protocol.

8. The method of claim 1, further comprising:
   determining when the primary port fails by examining a physical layer of the primary port.

9. The method of claim 1, further comprising:
   determining when the primary port recovers by examining a physical layer of the primary port.

10. The method of claim 1, wherein the primary port is a member of a load shared group.

11. The method of claim 10, wherein activating the redundant port is not performed until a threshold number of ports in the load shared group fails.

12. The method of claim 10, wherein updating the data path to use the redundant port instead of the primary port is not performed until a threshold number of ports in the load shared group fails.

13. The method of claim 1, wherein activating the redundant port and updating the data path to use the redundant port is performed in under 1 second.

14. The method of claim 1, wherein activating the redundant port and updating the data path to use the redundant port provides faster fail over for the data path than can be provided by a standby router protocol.

15. The method of claim 1, wherein the primary port fails as a result of a failure in an upstream switch and the redundant port uses a different upstream switch to further provide redundancy for the data path.

16. An apparatus for port redundancy comprising:
   a set of two or more primary ports;
   a set of two or more redundant ports designated to backup the primary ports, wherein any of the redundant ports may backup any of the primary ports;
   a switch fabric to maintain which of the primary and redundant ports is an active port for a data path; and
   a link monitor to cause the switch fabric to configure the data path to use the redundant port upon detecting a failure in a link to the primary port.

17. The apparatus of claim 16, wherein the link monitor detects failure in the link to a primary port using an auto-negotiation protocol.

18. The apparatus of claim 16, wherein the link monitor detects failure in the link to a primary port by obtaining information from a physical layer of a primary port.

19. The apparatus of claim 16, wherein the failure includes when the link is about to fail.

20. The apparatus of claim 16, further comprising:
   a port description table having a description of which of the primary and redundant ports is the active port for the data path.

21. The apparatus of claim 16, wherein one or more primary ports are a member of a load shared group and the link monitor causes the switch fabric to configure the data path to use a redundant port only after detecting a failure in a threshold number of members of the load shared group.

22. The apparatus of claim 16, wherein the link monitor causes the switch fabric to restore the active port to a primary port immediately upon detecting a recovery in the link status of the link to the primary port.

23. The apparatus of claim 22, wherein the link monitor detects the recovery in the link status of the link to a primary port using an auto-negotiation protocol.

24. The apparatus of claim 22, wherein the link monitor detects the recovery in the link status of the link to a primary port by examining a physical layer of the primary port.

25. The apparatus of claim 16, further comprising:
a port configuration data, wherein the port configuration data is used to configure the active port.

26. The apparatus of claim 25, wherein to configure the active port includes to specify how many ports are in a load shared group in which the active port is a member and a threshold number of member ports that must fail before the switch fabric is to configure the data path to use the redundant port.

27. A redundant port system comprising:
A set of two or more primary links to two or more primary ports;
A set of two or more redundant links to two or more redundant ports;
A status of each of the primary and redundant links to the primary and redundant ports;
A data path associated with one of the primary or redundant ports depending on the status of the respective links; and
A processor to cause the data path to be associated with the redundant port when the status of the primary link is failed, and to further cause the data path to be associated with the primary port when the status of the primary link has returned to normal, wherein any of the redundant ports may backup any of the primary ports.

28. The system of claim 27, wherein the status of the primary and redundant links is determined using an auto-negotiation protocol.

29. The system of claim 27, wherein the status of the primary and redundant links is determined by receiving a physical layer information from a media access control layer associated with the respective primary and redundant links.

30. The system of claim 27, wherein the data path is associated with the one of the primary or redundant ports by updating a port tag in a port description table, the port tag indicating an identifier of the associated port.

31. The system of claim 27, wherein a primary port is a member of a load shared group and wherein the processor causes the data path to be associated with the redundant port only after the status of the primary link to a threshold number of member ports is failed, and to further cause the data path to be associated with the member port when the status of the primary link to the threshold number of member ports has returned to normal.

32. The system of claim 27, further comprising:
a port configuration data, wherein the processor causes the port configuration data to be loaded to the redundant port when the status of the primary link failed, and to further cause the port configuration data to be restored to the primary port when the status of the primary link has returned to normal.

33. An article of manufacture comprising:
A machine accessible medium including data that, when accessed by a machine cause the machine to:
designating a backup port from a set of two or more redundant ports to backup a primary ports, wherein the redundant and primary ports are located in the same device and any of the redundant ports may be used to backup any of the primary ports;
Activating the redundant port when a primary port fails; and
Configure a data path to use the redundant port instead of the failed port.

34. The article of manufacture of claim 33, wherein the machine accessible medium further includes data that causes the machine to:
revert to the primary port when the primary port recovers, including inactivating the redundant port, activating the primary port, and reconfiguring the data path to use the primary port instead of the redundant port.

35. The article of manufacture of claim 33, wherein the machine accessible medium further includes data that causes the machine to:
designate a redundant port to backup a primary port, where such designation includes inactivating the redundant port until the primary port fails.

36. The article of manufacture of claim 33, wherein the machine accessible medium further includes data that causes the machine to:
determine when a primary port fails by using an auto-negotiation protocol.

37. The article of manufacture of claim 33, wherein the machine accessible medium further includes data that causes the machine to:
determine when a primary port fails by obtaining a physical layer information from the primary port.

38. The article of manufacture of claim 33, wherein the machine accessible medium further includes data that causes the machine to:
determine when a primary port recovers using an auto-negotiation protocol.

39. The article of manufacture of claim 33, wherein the machine accessible medium further includes data that causes the machine to:
determine when a primary port recovers by obtaining physical layer information from the primary port.

40. The article of manufacture of claim 33, wherein the machine accessible medium further includes data that causes the machine to:
activate the port, including updating a port designation in a port description table to the activated port, the port designation corresponding to the port designated for the data path.

41. The article of manufacture of claim 33, wherein the machine accessible medium further includes data that causes the machine to:
configure the data path, including updating a port designation in a route table corresponding to the data path.

42. The article of manufacture of claim 33 wherein the primary port is a member of a load shared group, and wherein the machine accessible medium further includes data that causes the machine to:
activate a redundant port when a threshold number of ports in the load shared group fails.

43. The article of manufacture of claim 42 wherein the machine accessible medium further includes data that causes the machine to:
configure the data path to use the redundant port instead of the primary port when a threshold number of ports in the load shared group fails.

44. The article of manufacture of claim 33 wherein the machine accessible medium further includes data that causes the machine to:
activate the redundant port and configure the data path to use the redundant port in under 1 second.

45. The article of manufacture of claim 33 wherein the machine accessible medium further includes data that causes the machine to:
activate the redundant port and configure the data path to use the redundant port to provide faster redundancy for the data path than can be provided by a standby router protocol.

* * * * *